United States Patent

Miwa

[15] 3,655,461

[45] Apr. 11, 1972

[54] FLUX FOR ALUMINUM SOLDERING

[72] Inventor: Keiji Miwa, Gifu, Japan

[73] Assignee: Sanyo Electric Works Ltd., Gifu, Japan

[22] Filed: Sept. 2, 1970

[21] Appl. No.: 69,131

Related U.S. Application Data

[63] Continuation-in-part of Ser. No. 741,217, June 28, 1968, abandoned.

[52] U.S. Cl. ..................................148/23, 148/24, 29/495
[51] Int. Cl. ..........................................................B23k 35/34
[58] Field of Search ........................................148/23, 25, 24

[56] References Cited

UNITED STATES PATENTS

| | | | |
|---|---|---|---|
| 2,286,298 | 6/1942 | Miller | 148/23 |
| 2,664,370 | 12/1953 | Snell | 148/23 |
| 3,040,781 | 6/1962 | Reymann et al. | 148/23 X |
| 3,459,606 | 8/1969 | Becker | 148/23 |

*Primary Examiner*—L. Dewayne Rutledge
*Assistant Examiner*—G. T. Ozaki
*Attorney*—Mason, Fenwick & Lawrence

[57] ABSTRACT

A flux for soldering aluminum and other nonferrous metals and iron to the same or different metals comprising 50–70 percent epoxide resin, 15–30 percent rosin 12–18 percent triethanolamine and 3–5 percent of a heavy metal fluoroborate or boron trifluoride monoethylamine and optionally an aromatic amine or amide.

11 Claims, No Drawings

FLUX FOR ALUMINUM SOLDERING

This application is a continuation-in-part of Ser. No. 741,217 filed June 28, 1968, now abandoned.

The invention relates generally to a flux for soldering. More particularly, the present invention is concerned with a flux for soldering any metal, such as aluminum, iron, brass, copper, etc., to the same or to other metals.

Aluminum has been used recently in place of copper for electric instruments and for power cables. With the increase in the amount of use of aluminum in the electric industry, many problems have arisen with respect to the method of joining aluminum with aluminum, copper, iron, and other metals.

The joining of aluminum has been made mechanically with rivets or screws, or by ordinary welding, pressure welding, or soldering. However, in every case, corrosion of aluminum at the junction is always troublesome. An improved welding method has been developed recently and has been widely adopted for practical use. However, this welding method requires a comparatively high temperature. The apparatus used for this welding is also large in size, so the welding of aluminum is limited for the adjoining of quite large bodies and it is not suited for the joining of small parts such as practiced in electronic instruments wherein copper wires have been mainly used with soft solders of a lead-tin system. The use of soft solders for the joining of aluminum would be a significant advantage when aluminum is used in the place of copper for electric apparatus. To date, no suitable soldering alloy for aluminum, nor a desirable flux to be used for aluminum soldering, has been developed.

The problems, basically, are those brought about by the characteristics of aluminum, which is a very chemically active metal and is readily oxidized when it is brought into contact with air. The oxide film is quite compact and stable, and covers all the aluminum surface. In order to use solder, it is necessary first to remove this oxide film. Halides such as chlorides or fluorides are usually added to the flux for this purpose. However, corrosion of aluminum is accelerated after the soldering is made, if these halides remain on the surface of the soldered junction after the soldering. Therefore, the soldered aluminum parts must be thoroughly washed with water after the soldering. The parts thereafter must be dried after washing with water.

This washing process is also troublesome to practice when a number of parts are soldered. In some cases, it is impossible to wash the soldered parts with water. Also, the soldered parts are readily corroded even when they are thoroughly washed with water. Therefore, some paints are applied on the surface of the soldered aluminum piece after rinsing with water to protect the surface from corrosion. Thus, the soldering of aluminum is accompanied by many troubles, so it is not widely adopted for industrial use even though the method of aluminum soldering has been known for years.

The present invention makes use of a mixture of a. 3 – 7 percent by weight of (1) fluoroborate of a heavy metal of the Periodic Table such as manganese, zinc, cadmium, chromium, iron, or tin, or (2) boron trifluoride monoethylamine which are hardeners for epoxide resin, and also achieves the removal of any oxide film on the metal;

b. 45 – 70 percent by weight of liquid or solid glycidyl type epoxide resin such as diglycidyl ether of bisphenol A or an epoxide resin having one or more epoxide ring(s) at the end(s) of/or in the carbon chain;

c. 12 – 18 percent by weight of triethanolamine; and d. 15 – 30 percent by weight of rosin.

By the use of this flux, satisfactory soldering of aluminum, quite suited for electronic and electric industries, have been made possible. This method gives a satisfactory method to achieve corrosion-resistant soldering, which has long been believed impossible. As is easily understood from its composition, most of the flux of the present invention hardens during the heating for soldering and covers the surface of the soldered part as a film.

The fluoroborates of the various heavy metals are decomposed to fluorides of the metals and boron trifluoride by heating above 100° C. The fluorides of metals are further decomposed to metals and fluorine, and the metals are deposited on the surface of aluminum as a thin film, which is easily wetted by a solder. The hardening of the epoxide resin is caused by the boron trifluoride or derivative borontrifluoride monoethylamine that remains after the removal of oxide film. Thus the boron trifluoride or derivative, which is effective for the removal of oxide film but is also quite corrosive for metals if permitted to remain on the soldered part after soldering, is completely consumed as a hardener of the epoxide resin. Therefore, it is not necessary to wash the soldered parts for the purpose of removing the remaining flux. Also the hardened film of epoxide resin, which is formed during the soldering on the soldered part, is moisture resistant. The soldered part therefore is completely covered with this film, so the corrosion resistance of the soldered part is even further improved. Manifestly, the flux of the present invention possesses excellent mechanical and chemical characteristics.

The combination of the epoxide resin and the flux that is useful in the removal of the oxide film not only eliminates the necessity of washing after soldering but also gives a strong and well adhering protective film on the surface of the soldered part. Its application is almost unlimited. This method gives an epoch-making soldering method of aluminum. The fluoroborate of the heavy metals, as well as the borontrifluoride monoethylamine being the hardener for the epoxide resin, becomes active only on heating, so simple mixing of this substance with the epoxide resin causes no hardening for a long time when left in contact with the air. When an epoxide resin of high molecular weight is mixed with the hardener, the resulting paste can be painted on aluminum sheets fixed on a base plate for printed circuits. It is thus possible to produce print bases of aluminum of the flux coating type. Also, it is possible to produce flux-containing thread type solder by the use of these characteristics of the flux of the present invention. This flux is further quite effective as a flux for the soldering of iron, copper, brass, and other metals to aluminum and to other metals.

Generally, it is desirable to form separate mixtures of the epoxide resin and the rosin as a first mixture and the hardener and triethanolamine as the second composition. The compositions are preferably unmixed until used. If the fluoroborate is in an aqueous solution as is frequently the case with commercial fluoroborates, the fluoroborate and the triethanolamine may be dehydrated by any suitable means such as vacuum dehydration.

The method of production and application will be described below in further detail.

EXAMPLE 1

70g of liquid diglycidyl ether of bisphenol A with an epoxy equivalent weight of 180 – 200 and with a molecular weight of 350 – 500 is mixed with 30g of purified rosin. The mixture is heated to about 150° C. until it liquefies. This solution for convenience is referred to as Solution A. 10g of 50wt. % aq. solution of zinc fluoroborate and 20g of triethanolamine are added to each other. The mixture is kept in a vacuum of about 20 Torr for 30 minutes to remove water contained in the mixture. This liquid is Solution B. Solutions A and B thus prepared are kept separately until use. Before use, Solutions A and B are mixed together in a weight ratio of 3:1. A suitable amount of this mixture is pasted on the surface of aluminum to be soldered. A suitable amount of conventional aluminum solder, e.g., an alloy of zinc and cadmium, is attached to the heated tip of a soldering instrument and then brought into contact with the aluminum. Then the soldering is easily completed. After the soldering, the surface of the soldered part becomes covered with a thin film of epoxide resin. The soldering thus made is durable in air, and its life is almost permanent. When the soldered parts are kept immersed in 3 percent brine for a month, no change is noticed.

EXAMPLE 2

70g of liquid diglycidyl ether of bisphenol A with same epoxy equivalent and molecular weight as in Example 1 is mixed with 30g of purified rosin. The mixture is heated to about 150° C. until it liquefies. This solution is Solution A. 12g of 50wt % aq. solution of cadmium fluoroborate and 20g of triethanolamine are added with each other. The mixture is kept in a vacuum of about 20 Torr for 30 minutes in order to remove the water contained in the mixture. This solution is Solution B. The Solutions A and B thus prepared are kept separately until use. The method of the application of this flux is the same as that described in Example 1.

EXAMPLE 3

70g of liquid diglycidyl ether of bisphenol A with same epoxy equivalent and molecular weight as Example 1 is mixed with 30g of purified rosin. The mixture is heated to about 150° C. until it liquefies. This solution is Solution A. 12g of 50wt. % aq. solution of tin fluoroborate and 20g of triethanolamine are added with each other. The mixture is kept in the vacuum of about 20 Torr for 30 minutes in order to remove the water contained in the mixture. This liquid is Solution B. The Solutions A and B are kept separately until use. The method of use of the flux thus prepared is the same as that described in Example 1.

EXAMPLE 4

In the place of Solution A in Example 1, 65 parts diglycidyl ether of bisphenol A with an epoxy equivalent of 500 – 2000 and with a molecular weight of 900 – 8000, which is solid at ordinary temperatures, is heated until it melts. 25 parts rosin is mixed with this liquid uniformly. 70 parts isobutyl alcohol as solvent is added to this mixture. The whole mixture can be used in the place of Solution A in Example 1. To Solution A thus prepared, Solution B in Example 1 is added in a weight ratio of 5:1 – 6:1 and is mixed well. The mixture is painted on all the surface of an aluminum sheet. The solvent soon evaporates off and the resulting plate does not adhere to any materials brought into contact with the plate. Soldering is easily made on any place on the plate thus prepared at any time. This method is quite effective in the production of printed circuits made of aluminum sheets. Also the flux obtained by mixing Solution A with B while A is warm enough, without mixing any solvent to A, is solid at room temperature. But it becomes viscous when it is heated to 50° – 60° C. It is therefore possible to prepare flux containing thread type soldering metal when this kind of flux is used at its center.

EXAMPLE 5

70g of liquid diglycidyl ether of bisphenol A with an epoxy equivalent weight of 180 – 200 and with a molecular weight of 350 – 500 is mixed with 30g of purified rosin. The mixture is heated to about 150° C. until it liquefies. This solution for convenience, is referred to as Solution A. 6g of borontrifluoride monoethylamine and 20g of triethanolamine are added to each other. The mixture is Solution B. Solutions A and B thus prepared are kept separately until use. Before use, Solution A and B are mixed together in a weight ratio of 3:1. A suitable amount of this mixture is pasted on the surface of aluminum to be soldered. A suitable amount of conventional aluminum solder, e.g., alloy of zinc and cadmium, is attached to the heated tip of a soldering instrument and then brought into contact with the aluminum. Then the soldering is easily completed. After the soldering, the surface of the soldered part becomes covered with a thin film of epoxide resin. The soldering thus made is durable in air, and its life is almost permanent. When the soldered parts are kept immersed in 3% brine for a month, no change is noticed.

EXAMPLE 6

70g of liquid diglycidyl ether of bisphenol A with same epoxy equivalent and molecular weight as in Example 1 is mixed with 30g of purified rosin. The mixture is heated to about 150° C. until it liquefies. This solution is Solution A. 10 – 12g of 50 wt. % aqueous solution of zinc, cadmium or tin fluoroborate and 20g of triethanolamine are added with each other. The mixture is kept in a vacuum of about 20 Torr for 30 minutes in order to remove the water contained in the mixture. This solution is Solution B. The Solutions A and B thus prepared are kept separately until use. The method of the application is the same as that described in Example 1.

EXAMPLE 7

In the place of solution A in Examples 1 and 2, 65 parts diglycidyl ether of bisphenol A with an epoxy equivalent of 500 – 2000 and with a molecular weight of 900 – 8000, which is solid at ordinary temperature, is heated until it melts. 25 parts rosin is mixed with this liquid uniformly. 70 parts isobutyl alcohol is added to this mixture as solvent. The whole mixture can be used in the place of Solution A in Examples 5 and 6. To 1 part of Solution A thus prepared, Solution B in Examples 5 and 6 is added in a weight ratio of 5:1–6:1 and mixed well. The mixture is painted on all the surface of an aluminum sheet. The solvent soon evaporates off and the resulting plate does not adhere to any materials brought into contact with the plate. Soldering is easily made on any place on the plate thus prepared at any time. This method is quite effective in the production of printed circuits made of aluminum sheets. Also the flux obtained by mixing Solution A with B while A is warm enough, without mixing any solvent to A, is solid at room temperature. But it becomes viscous when it is heated to 50° – 60° C. It is therefore possible to prepare flux-containing thread type soldering metal holding this kind of flux in its interior.

Optionally, 2 – 25 percent by weight various amines may be added to the composition particularly when borontrifluoride monoethylamine is used in order to assure complete hardening. Preferably, the amount of the amine used is 5 – 10 percent. These amines are, however, not necessary since at the usual soldering temperature the proper hardening of the epoxide will take place. If used, such amines as are set forth in may parent application are suitable and include the aromatic amines having a boiling temperature above 250° C.: m-phenylenediamine, toluenediamine, benzidine, diaminophenylmethone, trimethylaminomethylphenol, 4, 4'-methylenedianilene, diaminodiphenylsulfone, benzyldimethylamine, 2-methylbenzyldimethylamine and 2(dimethylaminomethyl) phenol; the amides: dicyanodiamide, amidopolyamide and fatty polyamide and in general those amidopolyamines derived from monobasic carboxylic acids, i.e., $CnH_{2}n+1$ COOH wherein $n$ is 16 – 19.

EXAMPLE 8

70g of liquid diglycidyl ether of bisphenol A with an epoxy equivalent weight of 180 – 200 and with a molecular weight of 350 – 500 is mixed with 30g of purified rosin. The mixture is heated to about 150° C. until it liquefies. This solution for convenience is referred to as Solution A. 16g of triethanolamine and 3g diamino diphenyl sulfone, which is an aromatic amine, are added with each other. The mixture is well mixed together, 6g of boron trifluoride monoethylamine is added to the mixture. The mixture is heated to 50° – 60° C. until it completely liquefies. This liquid is Solution B. Solutions A and B thus prepared are kept separately until use. Before use, Solutions A and B are mixed together in a weight ratio of 3:1. A suitable amount of this mixture is pasted on the surface of aluminum to be soldered. A suitable amount of conventional aluminum solder, e.g., an alloy of zinc and cadmium, is attached onto the heated tip of a soldering instrument and then brought into contact with the aluminum. Then the soldering is easily completed. After the soldering, the surface of the soldered part becomes covered with a thin film of epoxide resin. The soldering thus made is durable in air, and its life is almost permanent. When the soldered parts are kept immersed in 3 percent brine for a month, no change is noticed.

EXAMPLE 9

70g of liquid diglycidyl ether of bisphenol A with same epoxy equivalent and molecular weight as in Example 8 is mixed with 30g of purified rosin. The mixture is heated to about 150° C. until it liquefies. This solution is Solution A. 16g of triethanolamine and 5g of polyamide

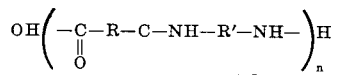

of amine value 200 – 320 are added with each other where R and R' are any divalent radicals. The mixture is well mixed together, 6g of boron trifluoride monoethylamine is added to the mixture. The mixture is heated to 50° – 60° C. until it completely liquefies. This solution is Solution B. The Solutions A and B thus prepared are kept separately until use. The method of the application of this flux is the same as that described in Example 8.

EXAMPLE 10

In the place of Solution A in Example 8, 50 parts diglycidyl ether of bisphenol A with an epoxy equivalent of 500 – 2000 and with a molecular weight of 900 – 8000, which is solid at ordinary temperatures is heated until it melts. 20 parts rosin is mixed with this liquid uniformly. 30 parts isobutyl alcohol as solvent is added to this mixture. The whole mixture can be used in the place of Solution A in Example 8. To Solution A thus prepared, Solution B in Example 8 is added in a weight ratio of 3:1–4:1 and is mixed well. The mixture is painted on all the surface of an aluminum sheet. The solvent soon evaporates off and the resulting plate does not adhere to any materials brought into contact with the plate. Soldering is easily made on any place on the plate thus prepared at any time. This method is quite effective in the production of printed circuits made of aluminum sheets. Also the flux obtained by mixing Solution A with B while A is warm enough, without mixing any solvent to A, is solid at room temperature. But it becomes viscous when it is heated to 50° – 60° C.

Thus the flux of the present invention is almost equal to or superior in its characteristics to the rosin flux used for soldering of brass with lead-tin alloy. From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A flux for soldering metals including non-ferrous metals comprising: 45 – 70 percent epoxide resin, 15 – 30 percent rosin, 12 – 18 percent triethanolamine, and 3 – 7 percent of a material selected from the group of a heavy metal fluoroborate and boron trifluoride monoethylamine.

2. The flux of claim 1 wherein the epoxide resin contains glycidyl groups.

3. The flux of claim 1 wherein the epoxide resin and the rosin form a first composition and the fluoroborate of metal and triethanolamine form a second composition, said compositions being unmixed.

4. The flux of claim 1 wherein the fluoroborate and triethanolamine are mixed and dehydrated.

5. The flux of claim 1 wherein the heavy metal is selected from the group of manganese, zinc, cadmium, chromium, iron and tin.

6. The flux of claim 1 wherein the epoxide resin is the diglycidyl ether of bisphenol A.

7. The flux of claim 1 wherein the heavy metal is selected from the group of manganese, zinc, cadmium, chromium, iron and tin and wherein the epoxide resin is the diglycidyl ether of bisphenol A.

8. The flux of claim 1 wherein 2 – 25 percent by weight amines selected from aromatic amines and amides are added.

9. The flux of claim 8 wherein the hardener is boron trifluoride monoethylamine.

10. The flux of claim 9 wherein 5 – 10 percent of the amine is used.

11. The flux of claim 8 wherein the aromatic amine has a boiling point greater than 250° C. and wherein the amide is a polyamide of a monobasic carboxylic acid.

* * * * *